United States Patent [19]

Schweigert

[11] Patent Number: 5,291,722
[45] Date of Patent: Mar. 8, 1994

[54] DUMP CLOTH FOR CART

[75] Inventor: James R. Schweigert, Plymouth, Minn.

[73] Assignee: JRCO, Inc., New Hope, Minn.

[21] Appl. No.: 896,416

[22] Filed: Jun. 10, 1992

[51] Int. Cl.$^5$ ................... A01D 57/00; A01D 75/00
[52] U.S. Cl. ................................. 56/203; 56/202; 298/6
[58] Field of Search ................. 56/202, 203, 205; 298/1 A, 1 B, 5, 6

[56] References Cited

U.S. PATENT DOCUMENTS

| | | | |
|---|---|---|---|
| 3,870,367 | 3/1975 | O'Brien | 298/1 B |
| 3,881,304 | 5/1975 | Lempke | 56/202 |
| 4,306,408 | 12/1981 | Christopherson et al. | 56/205 X |
| 4,699,393 | 10/1987 | Schweigert | 56/202 X |
| 4,787,197 | 11/1988 | Schweigert | 56/202 |
| 4,907,403 | 3/1990 | Jones | 56/202 |
| 5,070,687 | 12/1991 | Schweigert | 56/202 |
| 5,085,451 | 2/1992 | Schweigert | 56/202 X |

OTHER PUBLICATIONS

Brochure titled: "The Honda BC4050 Bagger Cart", dated 1992, published by American Honda Motor Co., Inc. (Exhibit A).
"Operator's Manual: Bagger Cart Model BC4050", dated Jan., 1992, published by American Honda Motor Co., Inc. (Exhibit B).

Primary Examiner—George A. Suchfield
Attorney, Agent, or Firm—Merchant, Gould, Smith, Edell, Welter & Schmidt

[57] ABSTRACT

The present invention relates to an apparatus for grass collectors and the like that allows the trailer boxes of such collectors to be easily emptied. The invention includes a liner disposed within the trailer box of a collector cart. The liner is pulled out of the trailer box to remove the material accumulated in the collector. The preferred apparatus is easily manufactured as it includes only a rod and cloth including clips. The rod is attached near the rear of the trailer box and the liner is rotatably attached to it. The opposite end of the liner is suspended to a frame in the front of the collector by clips. In between, the liner lies in the bottom of the trailer box and the grass clippings, leaves, etc. are allowed to fall on it during operation of the collector.

12 Claims, 4 Drawing Sheets

DUMP CLOTH FOR CART

BACKGROUND OF THE INVENTION

1. Field Of The Invention

The present invention relates to an apparatus for grass collectors and the like that allows the trailer boxes of such collectors to be easily emptied. Specifically, the present invention includes a flexible liner in the trailer box which allows grass clippings or leaves to be easily removed from the trailer box.

2. Description of the Related Art

Grass and leaf collectors for towing behind riding lawn mowers and garden tractors with mower decks are well-known in the prior art. Unloading these collectors of their accumulated grass clippings, leaves, or other material has, however, been a consistent problem.

U.S. Pat. No. 4,699,393 to Schweigert, discloses one such type of collector cart having a trailer box and attached cover. The cover is folded upwards and the front of the trailer box itself is rotated upwards to dump the contents of the trailer box onto the ground. Many other grass collectors have a similar design.

That unloading system has a number of disadvantages. The mechanism that allows rotation of the trailer box adds complexity and cost to the collector. The trailer box must be unlatched from the frame and lifted in order to start the removal process. In many cases that requires the operator to lift the load contained in the trailer box. That load can be substantial when it includes wet grass clippings or leaves or other materials. An alternative to requiring the operator to lift the trailer box is the use of a mechanism which automatically raises the trailer box. Such a mechanism adds considerably to the cost and complexity of the collector.

To fully clear the trailer box of materials, the tractor or riding mower must be moved forward while the box is in its upright position. That requires the operator to do a number of additional operations, including remounting the tractor if the trailer box was tipped upright by hand. In the alternative, the trailer box must be cleared by hand which presents an additional set of problems for the operator.

Other types of collectors include the use of bins which may be located in a trailer box as disclosed in U.S. Pat. No. 5,070,687, also to Schweigert. In that patent, bins are used to collect material blown into the collector. When the bins are full, they must be removed and dumped individually. That requires the operator to perform heavy lifting, which can cause a number of injuries. In the alternative, the operator must empty the collector before it reaches full capacity to keep the weight of the bins at a manageable level. That practice is, however, inefficient and adds to the time and fuel required to mow an area. In addition, the bins add additional expense to the manufacturing of the collector.

SUMMARY OF THE INVENTION

The present invention solves many of the disadvantages discussed above. The present invention comprises a liner disposed within the trailer box of a collector cart. The liner can be "pulled" out of the trailer box to remove the material accumulated in the collector.

The apparatus is easily manufactured as it includes only a rod and cloth including clips in the preferred embodiment. The rod is attached near the rear of the trailer box and the liner is rotatably attached to it. The opposite end of the liner is suspended to a frame in the front of the collector by clips. In between, the liner lies in the bottom of the trailer box and the grass clippings, leaves, etc. are allowed to fall on it during operation of the collector.

When the collector must be emptied, the operator opens the cover of the collector, detaches the clips holding the liner suspended at the front of the collector, and pulls the liner backwards to empty the trailer box.

The simplicity of the present invention results in a low-cost apparatus that effectively empties the trailer boxes of grass collectors with minimal lifting and minimal hand contact with the accumulated materials. In addition, there is no need to pull the riding mower or tractor forward during the dumping process and no bins must be handled and lifted by the operator during removal of clippings from the collector.

Another advantage of the present invention is that it can be retro-fitted to existing collectors having trailer boxes with covers. As a result, collectors in which the emptying mechanism is inoperative can be fitted with the present invention to extend their useful life.

These and other various advantages and features of novelty which characterize the invention are pointed out with particularity in the claims following this specification and forming a part hereof. However, for a better understanding of the invention and the advantages obtained by its use, reference should be made to the drawings which form a part hereof and to the accompanying descriptive matter in which there are illustrated and described preferred embodiments of the present invention.

DESCRIPTION OF THE PREFERRED EMBODIMENTS

Figure 1:
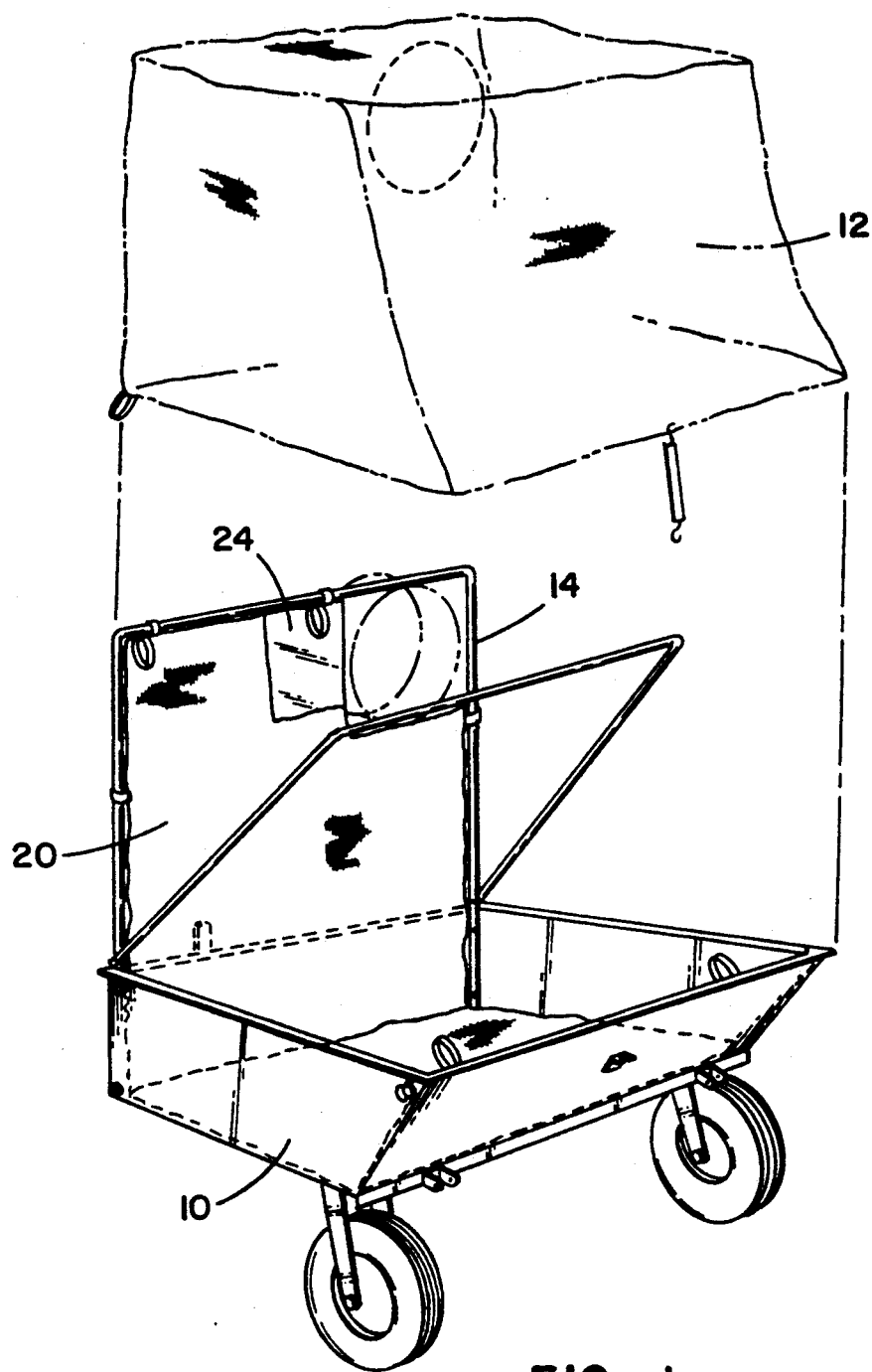
FIG. 1 illustrates a grass collector cart fitted with a liner according to the present invention.

FIG. 1 discloses a representative grass collector cart including a trailer box 10 and cover 12. Cover 12 is supported above the trailer box 10 by a frame 14. This trailer box is one of only many different varieties of collectors which can be adapted for use with the apparatus of the present invention. Construction of such a collector is described in any of U.S. Pat. Nos. 4,699,393 to Schweigert 4,787,197 Schweigert; 4,968,053 to Schweigert; and 5,085,451 also to Schweigert. All of these patents are herein incorporated by reference for their descriptions of the construction of grass collector carts including a trailer box and cover. It will be understood that the present invention could be used with many other similar collectors in addition to those described in the above patents. Because of the well-known nature of such collectors no further description of the collectors will be given herein.

Figure 2:
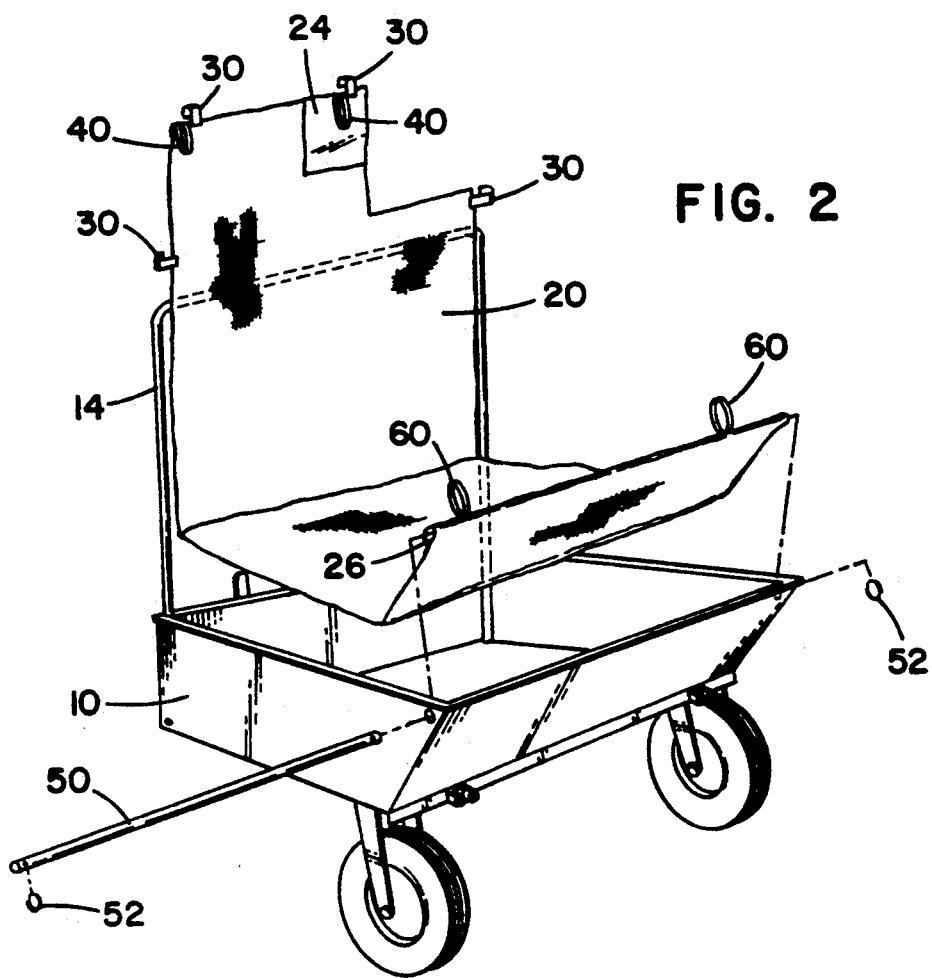
FIG. 2 illustrates the fitting of a liner according to the present invention into a trailer box.

Referring now to FIGS. 1 & 2, where the flexible liner 20 is shown as fitting inside a trailer box 10 of a grass collector cart. The preferred liner 20 includes a sleeve 26 formed along one edge. That sleeve 26 is adapted to receive rod 50 which fits within the rear edge of the trailer box. In that way, the flexible liner 20 is preferably rotatably attached to the trailer box 10. Those skilled in the art will understand that many other methods and devices could be used to rotatably attach the liner 20 to the rear of the trailer box 10.

In use, the liner 20 lays flat along the bottom of the trailer box 10 and is suspended along the front of the grass collector. In the preferred embodiment, the liner 20 is suspended by a plurality of plastic clips 30 which attach to the upright frame 14 disposed along the front of the grass collector cart. Clips 30 prevent the front of the liner from falling downward and allowing grass clippings to get behind the liner and frustrate the removal process. If the collector cart being used with the present invention lacks an upright frame, the operator may have to add a frame to the trailer box.

Figure 3:
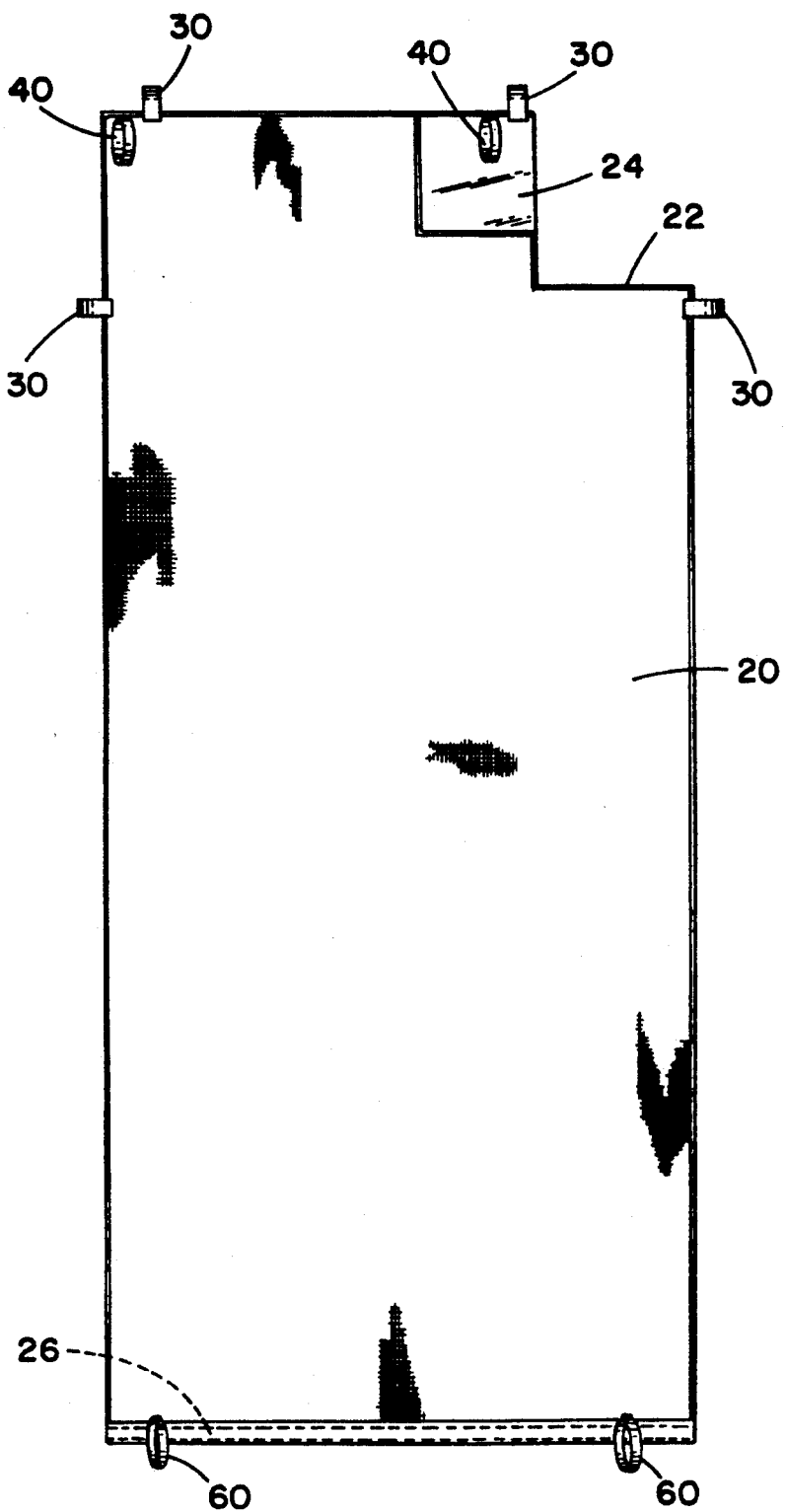
FIG. 3 illustrates a liner of the present invention.

As best shown in FIG. 3, liner 20 also includes a chute entry cut out 22 formed in one of its corners which allows the grass chute from the mower deck to enter into the space enclosed by the grass collector cart including its trailer box 10 and cover 12.

In the preferred embodiment, liner 20 also includes a viewing window 24 which is preferably constructed of a clear plastic material. This viewing window 24 allows the operator to monitor the amount of the material accumulating in the collector.

Figure 5:
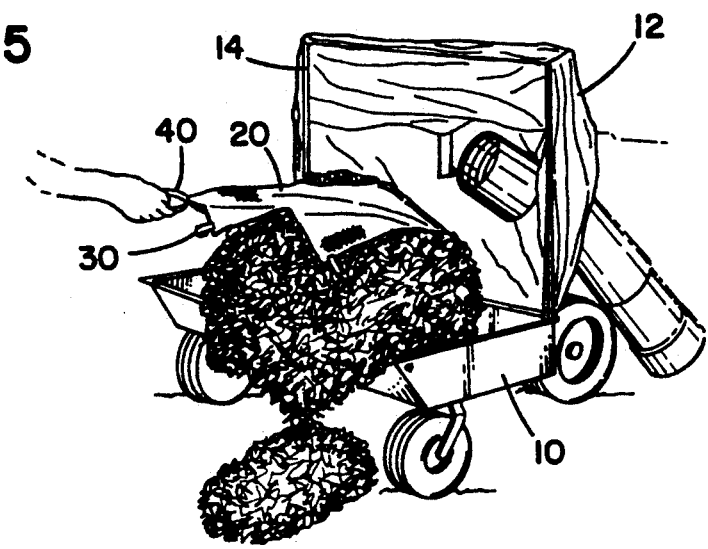
FIG. 5 illustrates the start of the process of removing collected material from a trailer box using the present invention.
Figure 6:
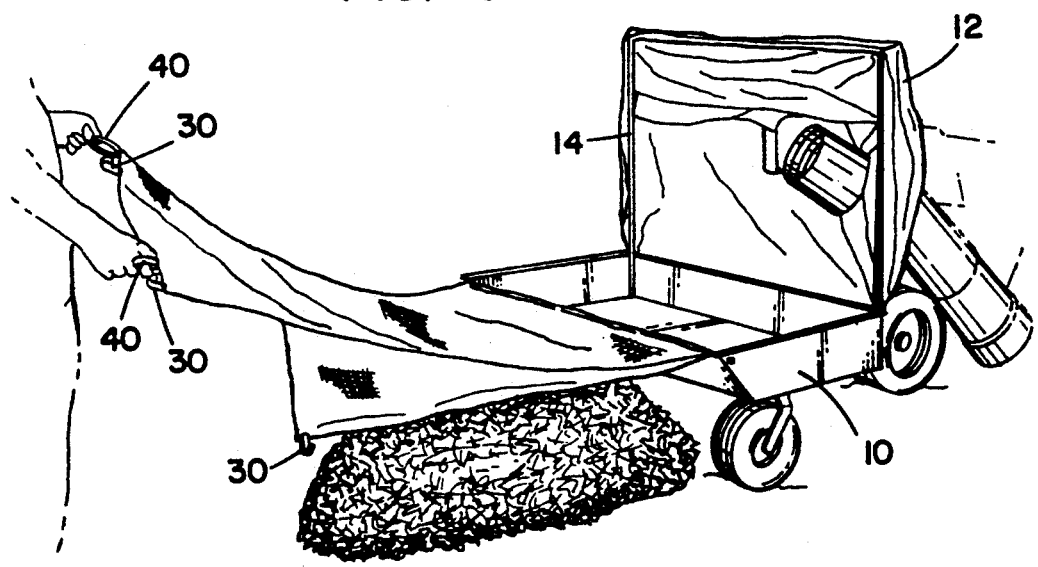
FIG. 6 illustrates the completion of the process of removing collected material from a trailer box using the present invention.

Also preferably attached to the liner 20 are handles 40 which are used to remove the collected material from the trailer box 10. That process is best illustrated in FIGS. 5 & 6. Clips 30 are detached from frame 12 and the operator pulls on handles 40 to essentially roll the collected materials out of the trailer box using liner 20. In an alternate preferred embodiment, handles 60 are provided along the side of the liner 20 in which sleeve 26 is formed. Handles 60 allow a user to lift the material out of the trailer box by essentially enclosing it within the liner 20 by use of handles 40 and handles 60.

Figure 4:
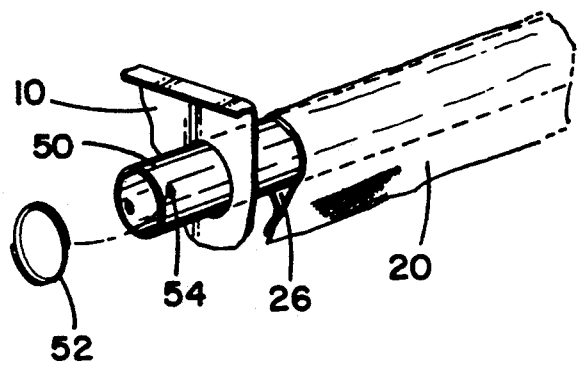
FIG. 4 is an enlarged view of the preferred connection between the rod, liner and trailer box of the present invention.

FIG. 4 discloses details of the preferred connection between the rod 50, trailer box 10 and sleeve 26. As shown, rod 50 fits within sleeve 26. Rod 50 preferably includes a hole 54 adapted to receive a circle clip 52. A similar hole is formed in the opposite end of rod 50. The circle clips 52 are used to maintain rod 50 within trailer box 10. Those skilled in the art will understand that many different methods of retaining the rod attached to the trailer box are possible and that this is only one of those many variations.

Those skilled in the art will also understand that the use of a sleeve to contain rod 50 within the liner 20 is only one of many ways of rotatably attaching liner 20 to rod 50 and that any other suitable mechanism could also be employed. Those mechanisms could include a plurality of loops attached to liner 20, with the loops being disposed around rod 50.

Liner 20 is preferably constructed of a flexible fabric although many other materials could be used in place of a fabric such as a plastic sheet or other flexible materials.

It is to be understood that even though numerous characteristics and advantages of the present invention have been set forth in the foregoing description, together with details of the structure and function of the invention, the disclosure is illustrative only and changes may be made in detail, especially in matters of shape, size and arrangements of parts within the principles of the invention to the full extent indicated by the broad general meaning of the terms in which the appended claims are expressed.

I claim:

1. An apparatus for removing grass clippings or leaves from a trailer box and cover over said trailer box, said apparatus comprising:
   a) a flexible liner adapted to fit within said trailer box, said flexible liner having first and second ends;
   b) attachment means for rotatably attaching said first end of said flexible liner proximate a rear of said trailer box; and
   d) a dump handle attached to said flexible liner proximate said second end, said dump handle adapted to allow manipulation of said flexible liner to allow removal of material such as grass clippings or leaves from said trailer box.

2. The apparatus of claim 1, wherein said attachment means further comprises:
   1) a rod attached within said trailer box proximate said rear of said trailer box;
   2) a sleeve formed in said flexible liner proximate said first end, said sleeve accepting said rod and allowing rotation of said flexible liner about said rod.

3. The apparatus of claim 2 wherein said rod is removably attached to said trailer box and further comprising a sleeve handle attached to said flexible liner proximate said first end, whereby said dump handle and sleeve handle can be used to lift material out of said trailer box.

4. The apparatus of claim 1, wherein said flexible liner further comprises a chute entry cutout to allow entry of a blower chute into said trailer box and cover.

5. The apparatus of claim 1, wherein said flexible liner further comprises a viewing window.

6. The apparatus of claim 1, further comprising support means for supporting a portion of said flexible liner proximate said second end of said liner above said trailer box.

7. The apparatus of claim 6, wherein said support means further comprises:
   a) a frame supported above said trailer box, said frame located proximate a front of said trailer box; and
   b) a plurality of clips attached to said frame and said flexible liner; whereby a portion of said flexible liner can be supported above said trailer box.

8. An apparatus for removing grass clippings or leaves from a trailer box and cover over said trailer box, said apparatus comprising:
   a) a flexible liner adapted to fit within said trailer box, said flexible liner having first and second ends;
   b) a rod attached to said trailer box proximate a rear of said trailer box;
   c) a sleeve formed in said flexible liner proximate said first end, said sleeve accepting said rod and allowing rotation of said flexible liner about said rod;
   d) support means for supporting a portion of said flexible liner above said trailer box, said support means further comprising:
      1) a frame supported above said trailer box, proximate a front of said trailer box; and
      2) a plurality of clips attached to said frame and said flexible liner, said plurality of clips and said frame supporting a portion of said flexible liner above said trailer box; and e) a dump handle attached to said flexible liner proximate said second end, said dump handle adapted to allow manipulation of said flexible liner to allow removal of material such as grass clippings or leaves from said trailer box.

9. The apparatus of claim 8, wherein said rod is removably attached to said trailer box and further comprising a sleeve handle attached to said flexible liner proximate said first end, whereby said dump handle and sleeve handle can be used to lift material out of said trailer box.

10. The apparatus of claim 8, wherein said flexible liner further comprises a chute entry cutout to allow entry of a blower chute into said trailer box and cover.

11. The apparatus of claim 8, wherein said flexible liner further comprises a viewing window.

12. An apparatus for removing material such as grass clippings or leaves from a collector having a trailer box and cover over said trailer box, said apparatus comprising:
 a) a flexible liner adapted to fit within said trailer box, said flexible liner having first and second ends;
 b) a rod removably attached within said trailer box, said rod attached proximate a rear of said trailer box;
 c) a sleeve formed in said flexible liner proximate said first end, said sleeve accepting said rod and allowing rotation of said flexible liner about said rod;
 d) support means for supporting a portion of said flexible liner above said trailer box, said support means further comprising:
  1) a frame supported above a front of said trailer box; and
  2) a plurality of clips attached to said frame and said flexible liner; said plurality of clips and said frame supporting a portion of said flexible liner above said trailer box;
 e) a dump handle attached to said flexible liner proximate said second end, said dump handle adapted to allow manipulation of said flexible liner to allow removal of material such as grass clippings or leaves from said trailer box;
 f) a sleeve handle attached to said flexible liner proximate said first end, whereby said dump handle and sleeve handle can be used to lift material out of said trailer box; and
 g) a chute entry cutout in said flexible liner to allow entry of a blower chute into said trailer box and cover.

* * * * *